United States Patent [19]
Stocchiero

[11] Patent Number: 6,022,636
[45] Date of Patent: *Feb. 8, 2000

[54] CASE FOR LEAD ACCUMULATORS

[76] Inventor: Olimpio Stocchiero, Via Kennedy 5 - 36050, Montorso Vicentino (VI), Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/981,741

[22] PCT Filed: Apr. 11, 1997

[86] PCT No.: PCT/EP97/01824

§ 371 Date: Dec. 23, 1997

§ 102(e) Date: Dec. 23, 1997

[87] PCT Pub. No.: WO97/40538

PCT Pub. Date: Oct. 30, 1997

[30] Foreign Application Priority Data

Apr. 24, 1996 [IT] Italy ................................. VI96A0068

[51] Int. Cl.[7] ............................. H01M 2/38; H01M 2/02
[52] U.S. Cl. ............................ 429/81; 429/176; 264/564
[58] Field of Search .................................. 429/67, 70, 72, 429/81, 163, 176; 264/563, 564, 573

[56] References Cited

U.S. PATENT DOCUMENTS

| | | | |
|---|---|---|---|
| 2,584,117 | 2/1952 | Elrod, Jr. | 429/70 X |
| 3,214,296 | 10/1965 | Smatko | 429/72 |
| 3,843,025 | 10/1974 | Holt . | |
| 4,286,027 | 8/1981 | Shropshire et al. | 429/70 X |
| 5,011,747 | 4/1991 | Strong et al. | 429/67 X |
| 5,064,101 | 11/1991 | Richter et al. . | |
| 5,307,956 | 5/1994 | Richter et al. . | |
| 5,718,986 | 2/1998 | Brenner | 429/70 X |

FOREIGN PATENT DOCUMENTS

| | | |
|---|---|---|
| 60-056364 | 1/1985 | Japan . |
| 694432 | 7/1953 | United Kingdom . |
| 9420994 | 9/1994 | WIPO . |
| 9429907 | 12/1994 | WIPO . |

*Primary Examiner*—Stephen Kalafut
*Attorney, Agent, or Firm*—Watson Cole Grindle Watson P.L.L.C.

[57] ABSTRACT

A case for accumulators in which side walls lying in perpendicular planes are connected by a connecting wall. The intersecting planes define a corner and external profile for the container. An adduction tube is formed integral with the outer surface of the connecting wall within the profile.

5 Claims, 3 Drawing Sheets

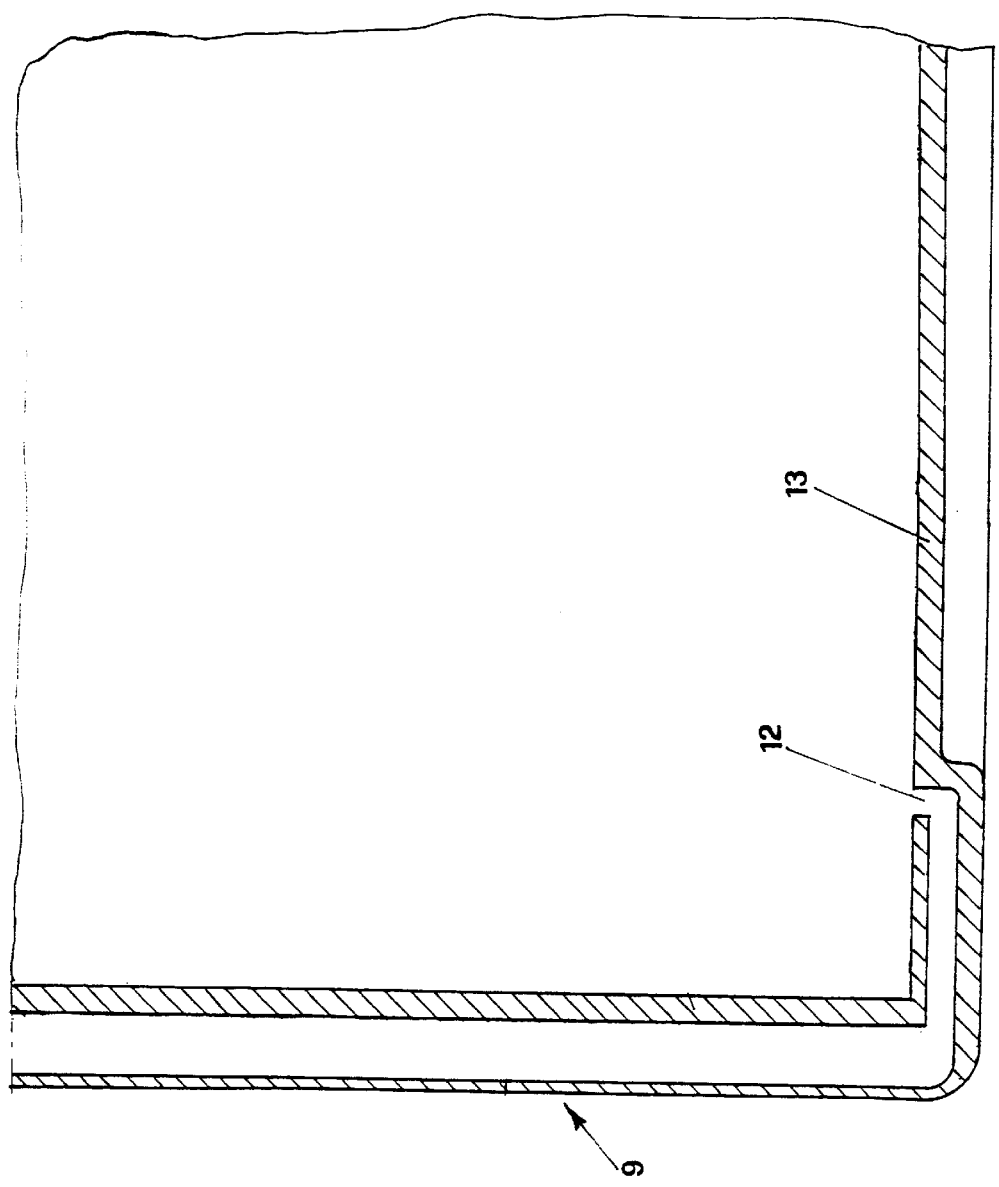
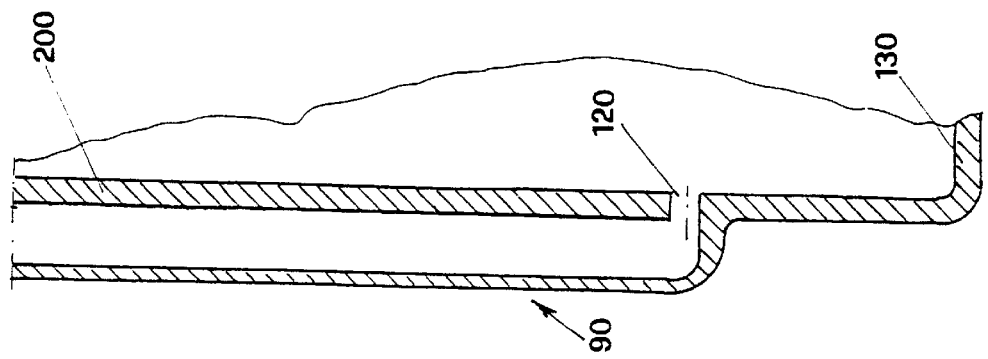

CASE FOR LEAD ACCUMULATORS

The invention relates to an improved case, particularly suitable for making lead accumulators.

As known, the cases used for making accumulators generally comprise a container provided with one or more than one cell, suitable for containing an electrolyte, in which the accumulator elements and a lid, coupled with the perimetrical edge of the opening of said container, are immerged. Said lid is provided with at least one couple of holes suitable for receiving the poles connected to said elements, and at least a through hole connected to the internal of said container.

Internally or externally from said container, one or more tubes, which have an end placed close to the opening of said container, may be placed, while the opposite end communicates with the interior of the container through its bottom.

Such adduction tubes have a double function, because during the first or initial charging of the accumulator they are used for the recirculation of the electrolyte, so that the charging becomes quicker, while during subsequent recharging made during life of the accumulator, they are used to introduce at the container bottom some air suitable for moving the electrolyte and for preventing the stratification.

Such adduction tubes, in the shapes of known type, communicate with special adduction plugs for the electrolyte or for air placed in the through hole made in the lid through tubes made in the lid itself.

According to some shapes of the known type, the adduction tubes are located internally or externally from the container, which they are fixed to by gluing. According to other making systems suitable for obtaining a better quality of the manufacture, the adduction tubes are made integral with the container, directly during the moulding.

In particular, a known method provides that the adduction tubes are made during the moulding of the container with gas co-injection.

Such a moulding method with gas co-injection is disadvantageous because it requires the realization of a die provided with a matrix and with a punch, which is very expensive to build, especially when said adduction tubes have to be made with the presence of undercuts.

It is very important that when said adduction tubes are located externally from the container, they don't modify the outline of the container itself, and for this reason they are preferably placed at the edges of the container.

It is also to be considered that in the accumulators, which have the external measures equal, the quantity of electrolyte in a container increases as the wall thickness of the container decreases. This thickness, in the containers obtained by mould injection or gas co-injection moulding, cannot fall under a minimal value.

It is desirable to to provide a container which, compared to the containers of the known type equal adduction tubes with external dimensions, having a larger volume of electrolyte, while the volume of the accumulator elements immerged in the electrolyte itself is the same.

Said aims are achieved providing a case for accumulators which, according to the invention, comprises:
a container having one or more cells suitable for containing an electrolyte in which are immerged the elements of said accumulator;
a lid coupled to the perimetrical edge which delimitates the interior of said container;
at least an adduction tube formed in the lateral surface and having a first opening located next to said perimetrical edge which delimitates the inlet of said container and a second opening communicating with the internal area of the container itself located next to its bottom, and it is characterized in that at least said adduction tube is placed externally from said container and is made using the blowing technique at the same time on the container resulting in a unique shape.

Advantageously, the container of the invention allows manufacture of cases for accumulators with reduced costs than the techniques usually adopted, because the manufacture is quicker and also because some material is saved.

So advantageously said cases, compared to equivalent cases having the same features, have a bigger internal volume and so they enable to realize accumulators with a better quality and efficiency, because the relationship between the electrolyte volume and the volume of the elements immerged in said electrolyte.

Said aims and advantages will be better understood in the description of a preferred realized form of the invention, which is given as an indicative, but not limitating example, and represented in the accompaining drawings wherein:

FIG. 5 represents the opening of the adduction tube, which communicates with the container internal of FIG. 1 in the bottom area;

FIG. 6 represents, according to another solution, the opening of the adduction tube, which communicates with the inlet container of FIG. 1 in the bottom area.

Figure 1:
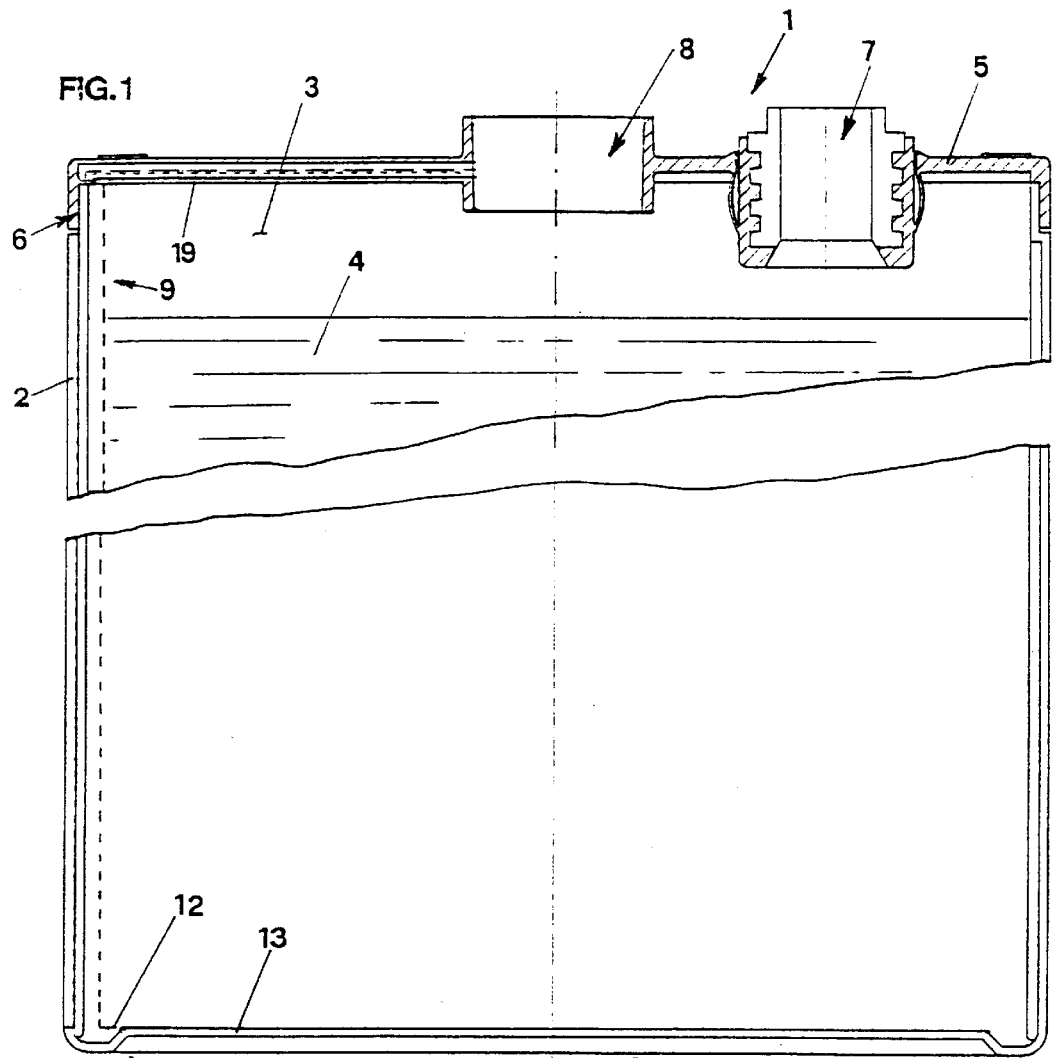
FIG. 1 represents a longitudinal section of the case for accumulators of the invention.
Figure 2:
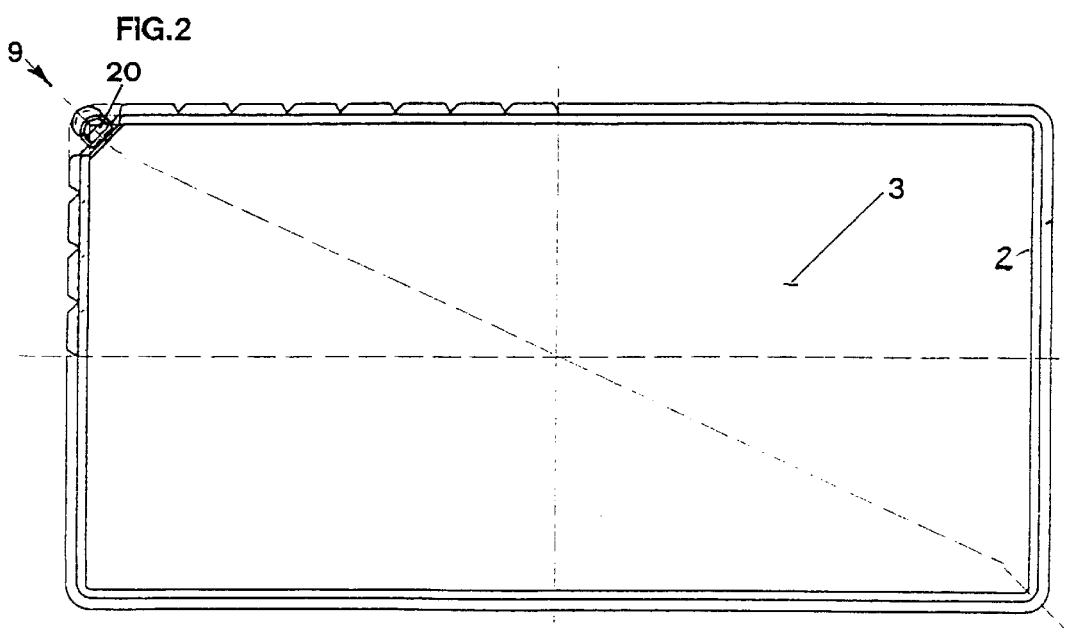
FIG. 2 represents the case of FIG. 1 without its lid.

As it can be seen in FIG. 1, the case of the invention, on the whole indicated by 1, comprises:
a container 2 having a cell 3 suitable for containing an electrolyte 4 wherein the elements of said accumulator, not seen in the figure, are located;
a lid 5 coupled to the perimetrical edge 6 which delimits the opening of said container 2, provided with at least a two of first holes 7, each one suitable for receiving one of the poles (not shown in the figure), connected to said elements of said accumulator and at least a second hole 8 communicating with the internal of said container 2;
at least one adduction tube 9 located at the lateral surface of said container 2 and having a first opening 20 placed at the perimetrical edge 6 of said container 2 and a second opening 12, placed at the opposite side of the second opening and visible in FIG. 5, communicating with the interior of said cell 3 in the bottom area 13 of said container 2.

Figure 3:
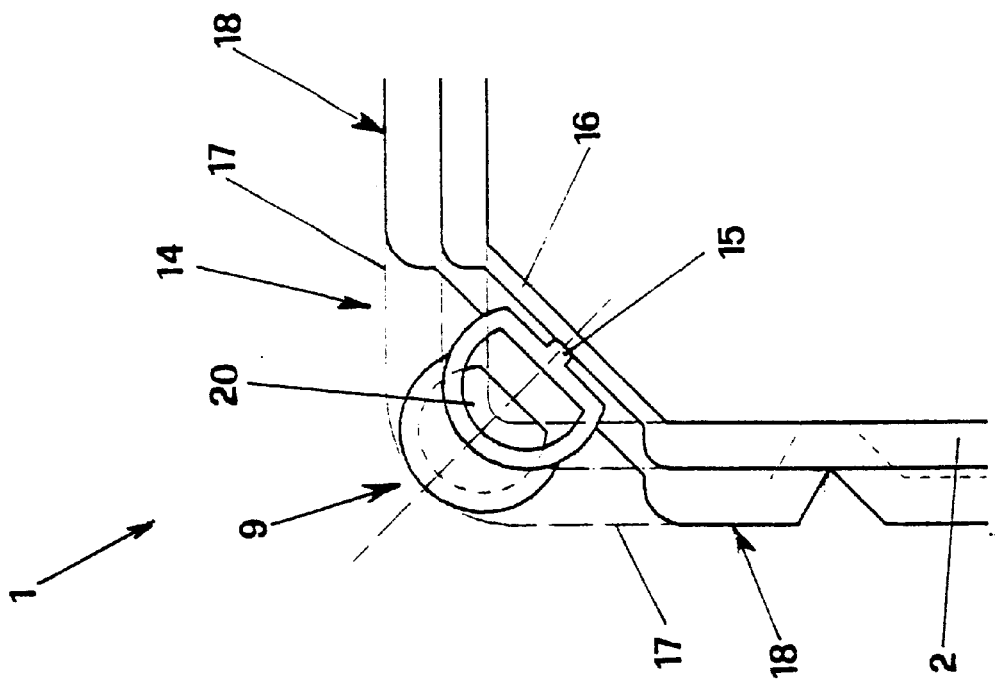
FIG. 3 represents a top view the edge portion of the container of FIG. 2, wherein the adduction tube is located.
Figure 4:
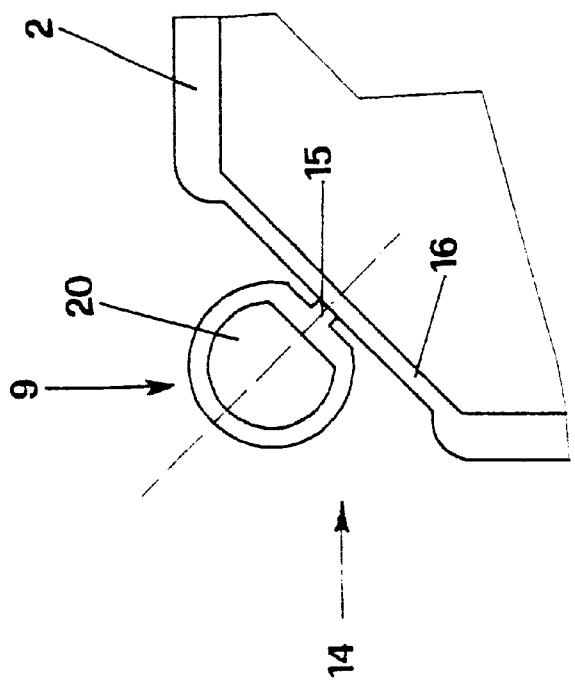
FIG. 4 represents the particular of the adduction tube in FIG. 3, limited to its outline in the opening plane of the container.

As we can see in FIG. 3 and 4, said adduction tube 9 is placed at the edge 14 of the container, and more precisely is provided with a rib 15 which all extends the full the height of the container and permits the connecting of it to the plane wall 16 which chamfers the container at the edge 14.

In particular, FIG. 4 represents in a top view the outline of the adduction tube 9 which at the opening of the container 2, as it can be seen in FIG. 3, joints with the body of the adduction tube 9 which is contained into the external profile 17, defined on the extension of the external surface of the lateral walls 18 of the container 2. In this way the adduction tube 9 defines a recess, in correspondence with the edge 6 of the container 2, which permits the coupling of the lid 5, avoiding the protrusion of the lid 5 from the container 2.

In particular, one or more horizontal ducts 19 are made on said lid 5.

They communicate with said first opening 20 of the adduction tube 9, placed in correspondence with the edge 6, and connect the lid to a feeding device, not shown, which is applied on the second hole 8 of the lid itself.

Such a feeding device permits the introduction of the elctrolyte during the first loading of the accumulator or the blowing in air which, entering the container 2 through the second opening 12 made at the bottom, prevents the stratification of the electrolyte during the subsequent loadings.

It is very important to specify that the thicknesses of the container walls 2 and of the adduction tube 9 are thin because the adduction tube and the container are both obtained during the blow molding of the container 2 and thus are formed integrally.

The housing of the adduction tube 9, in correspondence with the external edge of the container 2 and their realization with thin walls obtained with the blow mold method, permits formation of a container which, with equal external conditions, has an internal volume bigger than the containers of the known type.

Consequently, the container is able to contain a greater volume of electrolyte, thus realizing a better relationship between the electrolyte volume and the volume of the elements contained in said container.

The accumulator realized using the case of the invention presents, compared to other accumulators of the known type equivalent to it and having the same external measures, a better quality and efficiency.

According to an executive variant represented in FIG. 6, the second opening 120 of the adduction tube 90 communicating with the entire container 200 is placed at the lateral wall next to the bottom 130.

It is obvious that during the executive phase any other adduction tube could be applied to the external side of the container and it could be realized even in a position different from the angular position.

In other realized shapes the container could be provided with any quantity of adduction tubes, however well-shaped and placed.

The above-mentioned and other possible variants which in the executive phase could be made on the invention, however, are all protected in this patent.

We claim:

1. A case for accumulators for receiving elements to be submerged in an electrolyte comprising, a container having a bottom wall, a plurality of lateral walls extending upwardly from said bottom wall and forming a cell for receiving electrolyte therein, said walls having upper edges defining an open top of the container, adjacent pairs of said lateral walls, each of a particular pair of said sidewalls having substantially planar inner and outer surfaces, said particular pair of sidewalls being connected by a connecting wall having substantially planar inner and outer surfaces extending at obtuse angles to the inner and outer surfaces of said particular pair of sidewalls, said outer surfaces of said particular pair of sidewalls defining planes which intersect one another to define a corner and a corresponding external profile thereof, a lid for closing the open top of the container, an adduction tube formed integral with the outer surface of said connecting wall, said adduction tube having a first opening adjacent said open top of the container, said lid having a duct in communication with said first opening, said lid having a further opening therein in communication with said duct, said adduction tube having a second opening located adjacent said bottom wall of the container, said adduction tube being disposed completely within said external profile of said corner.

2. A case as defined in claim 1 wherein said second opening is formed in the bottom wall of said container.

3. A case as defined in claim 1 wherein said opening is formed in a lateral side wall of said container and is spaced a short distance above the bottom wall of said container.

4. A case as defined in claim 1 including a rib joining said adduction tube to the outer surface of said connecting wall.

5. The method of forming a container for accumulators for receiving elements to be submerged in an electrolyte wherein the container has a bottom wall, a plurality of lateral walls extending upwardly from said bottom wall and forming a cell for receiving electrolyte therein, said walls having upper edges defining an open top of the container, adjacent pairs of said lateral walls, each of a particular pair of said sidewalls having substantially planar inner and outer surfaces, said particular pair of sidewalls being connected by a connecting wall having substantially planar inner and outer surfaces extending at obtuse angles to the inner and outer surfaces of said particular pair of sidewalls, said outer surfaces of said particular pair of sidewalls defining planes which intersect one another to define a corner and a corresponding external profile thereof, an adduction tube formed integral with the outer surface of said connecting wall, said adduction tube having a first opening adjacent said open top of the container, said adduction tube having a second opening located adjacent said bottom wall of the container, said method comprising the step of simultaneously blow-molding the container to form the adduction tube integral with the outer surface of said connecting wall with the adduction tube disposed completely within the external profile at said corner.

* * * * *